United States Patent Office 2,862,934
Patented Dec. 2, 1958

2,862,934

METHOD OF PRODUCING TACHYSTEROL AND DIHYDROTACHYSTEROL

Arie Lambertus Koevoet and Arie Verloop, Leiden, and Jan Anne Keverling Buisman and Pieter Westerhof, Weesp, Netherlands, assignors, by mesne assignments, to North American Philips Company, Inc., New York, N. Y., a corporation of Delaware No Drawing. Application February 10, 1956
Serial No. 564,624

Claims priority, application Netherlands June 14, 1955

10 Claims. (Cl. 260—397.2)

The invention relates to the transformation, with the aid of a catalyst, of compounds produced during ultraviolet irradiation of 3-hydroxy-Δ-5.7-sterols, the hydroxyl-group of which may be esterified for example, with an acetyl-group.

The invention relates particularly to the production of tachysterols or esters thereof and of dihydro-tachysterols to be produced by reduction from tachysterols or esters thereof.

The term tachysterol is to be understood to mean a compound which is produced by ultraviolet irradiation of a solution of 3-hydroxy-Δ-5.7-sterols, this tachysterol exhibiting a maximum in the absorption spectrum at 2810 A. and being characterized by the following structural formula:

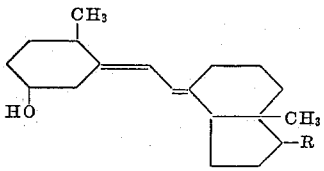

In the formula R may designate an aliphatic hydrocarbon residue which may include one or more double bonds.

The fact that a tachysterol has this formula is rendered plausible by a publication of Inhoffen (Chemische Berichten, 87 1407–1425 (1954)).

The term dihydrotachysterol is to be understood to mean a product obtained by reduction of a tachysterol by means of an alkalimetal and alcohol and having the formula:

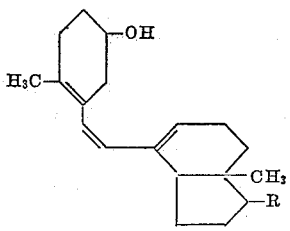

The stereochemical configuration neither of tachysterol, nor of dihydro-tachysterol is completely fixed. It is known that there are various sterols which have a hydroxyl-group bond at the position 3 of the sterol skeleton and which have a double bond each between the carbon atoms 5.6 and 7.8.

Examples of these sterols are: ergosterol and 7-dehydrocholesterol. In accordance with the aforesaid definitions there are different compounds which may be designated either by tachysterol or by dihydro-tachysterol. There is known, for example, tachysterol$_2$ and dihydro-tachysterol$_2$, which compounds are produced by irradiation of ergosterol and by reduction of the irradiation product respectively. By analogy with the terminology used above for the irradiation product of ergosterol the irradiation product of 7-dehydrocholesterol is termed tachysterol$_3$ and the product obtained by reduction from tachysterol$_3$ could be designated by dihydro-tachysterol$_3$.

It is known that dihydro-tachysterol$_2$ is a compound which has a strongly intensified effect on the calcium content of the blood. The applicant has found that this also applies to mixtures containing dihydro-tachysterol$_3$.

Windaus has described in "Annalen der Chemie" vol. 499, pages 190 ff. of 1932 a method of producing tachysterol$_2$ by ultraviolet irradiation of ergosterol. The author indicates that by ultraviolet irradiation of ergosterol tachysterol$_2$ is formed, this transformation being particularly conspicuous with the use of ultraviolet light of a wave-length of less than 2840 A.

The corresponding ester of tachysterol$_2$ is produced by solving the raw irradiation mixture with 3.5-dinitro-4-methyl-benzoylchloride in pyridine, subsequent to the removal of ergosterol. This compound can be recrystallized from acetone and melts at 154° to 155° C.

The reduction of tachysterol$_2$ to obtain dihydrotachysterol$_2$ may be carried out with the aid of sodium and an aliphatic alcohol, for example, ethanol or propanol or polyhydric alcohols, for example, ethylene glycol or glycerol. The dihydro-tachysterol$_2$ may be isolated from the raw reduction mixture via an ester. To this end the raw mixture, subsequent to chromatographic purification, may be transformed with an anhydride of a lower aliphatic carboxylic acid in the presence of pyridine, the corresponding ester of dihydro-tachysterol$_2$ being thus formed. This ester can be purified by recrystallisation and be readily saponified to form dihydro-tachysterol$_2$.

This production of tachysterol$_2$ and dihydro-tachysterol$_2$ has various disadvantages.

In practice the production of tachysterol$_2$ by the irradiation of ergosterol with short-wave ultraviolet light of a wavelength at which the production of tachysterol per photon is at a maximum (i. e. at a wavelength of less than 2840 A.) is small per unit time. For the irradiation with light of the said wave-range use is made of low-pressure mercury vapour tubes, i. e. tubes having a comparatively low power. Thus many tubes are required or the reaction must be continued for a long time to obtain a reasonable production.

A further disadvantage is that during the irradiation reaction a large number of products is formed and that the isolation and purification of tachysterol$_2$ is a rather elaborate operation.

It has been found that tachysterol or esters thereof can also be produced from pre-calciferol or esters thereof, whilst the aforesaid disadvantages are avoided.

A pre-calciferol is to be understood to mean a compound, which, upon ultraviolet irradiation, is formed from a 3-hydroxy-Δ-5.7 sterol and which has a maximum in the absorption spectrum at 2625±10 A.

A method of producing a pre-calciferol from ergosterol (so-called pre-calciferol-2) and a further pre-calciferol from 7-dehydrocholesterol (so-called pre-calciferol-3) is described by Velluz in "Bulletin Soc. Chim." 1949, page 501.

In accordance with the invention it has now been found that a pre-calciferol or an ester thereof can be transformed into a tachysterol or an ester thereof with the aid of a catalyst which is capable of furthering the transposition of cis-isomers into trans-isomers.

Accordingly, the invention relates to a method of producing a tachysterol or an ester thereof and of a dihydro-tachysterol to be produced therefrom by reduction and is characterized in that to a neutral or weak alkaline solution of a pre-calciferol or an ester thereof is added a catalyst, which is capable of transposing cis-isomers into trans-isomers, while subsequently by reduction with the aid of an alkaline metal and an aliphatic alcohol, the tachysterol produced or an ester thereof is transformed into a dihydro-tachysterol.

Catalysts capable of producing the said transposition are, for example, iodine or eosine, under the action of light which is absorbed during the reaction.

The invention is particularly important to produce from pre-calciferol-2 or pre-calciferol-3 or from the esters thereof, tachysterol₂ and tachysterol₃ or the esters thereof respectively and, if desired, dihydro-tachysterol₂ and dihydro-tachysterol₃ by reduction of these compounds.

It is of great importance that during the reaction the solvent should not exhibit acidic reaction. It has been found that even the formation of traces of acid has an adverse effect on the production of tachysterol. It is therefore advisable to add to the solvent employed a compound which is capable of binding any acids produced.

To this end use may be made of tertiary amines, which do not render the catalyst inactive, for example pyridine, collidine and quinoline.

Since also the solvents employed might form an acid under the action of the catalyst, it is advisable to choose the solvent with some care.

It has been found that hydrocarbons or mixtures thereof for example paraffin oil ether, ligroin, petrol are very suitable. Very satisfactory results were also obtained with benzene, toluene and cyclohexane.

As an alternative, ethers, for example, diethylether and, moreover, carbon disulphide may be employed.

If the transformation of pre-calciferol into tachysterol takes place in liquids referred to in the preceding paragraph, it is advisable to keep the concentration of pre-calciferol low, i. e. lower than 1 mg. of pre-calciferol per 100 ccm. of solvent, since otherwise the so-called isotachysterol is produced. This compound presumably has the formula:

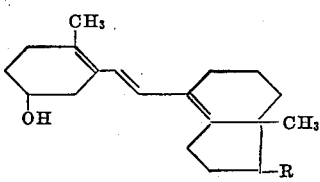

This restriction, however, is not necessary, if a compound capable of binding acids, for example, the aforesaid tertiary amines, are added to the solvents.

It has been found that lower aliphatic alcohols, for example, methanol, ethanol or propanol and furthermore halogenated alkanes, for example, methylene-chloride, chloroform, carbon tetrachloride and ethylene-dichloride are less suitable as solvents.

It has been found that the transformation of precalciferol into tachysterol by the method according to the invention is little affected by the presence of products formed at the formation of pre-calciferol, for example the byproducts formed during the radiation of a 3-hydroxy-Δ-5.7-sterol.

For the production in accordance with the invention of a tachysterol or an ester thereof and of a dihydro-tachysterol use may therefore be made of the product containing the raw pre-calciferol and of pre-calciferols or the esters thereof subsequent to purification as a starting material.

In order to produce a most pure tachysterol or an ester thereof and a dihydro-tachysterol the starting material is preferably a most pure pre-calciferol or an ester thereof. Pre-calciferol may be produced in the pure state most readily by Velluz' method.

A maximum production of tachysterol, calculated on 3-hydroxy-Δ-5.7-sterol, is obtained, however, if the raw irradiation product of a 3-hydroxy-Δ-5.7-sterol is exposed to the influence of the catalyst without an intermediate purification, since during the irradiation reaction both a pre-calciferol and a tachysterol are formed. Owing to the transformation of pre-calciferol into tachysterol with the aid of a catalyst the maximum formation of tachysterol is obtained, calculated on 3-hydroxy-Δ-5.7-sterol or esters thereof as a starting product.

If the raw radiation product of a 3-hydroxy-Δ-5.7-sterol is used for the production of a tachysterol, it is possible to perform the catalytical transformation of the pre-calciferol formed into a tachysterol in the same solvent which is irradiated; if at least the solvent permits in it the catalytical transformation. Such solvents are for example, benzene, cyclohexane or diethyl-ether.

The purification of the raw tachysterol need not give rise to particular difficulties for those skilled in the art. If the tachysterol is obtained by treating the raw irradiation product with the catalyst, so that the raw tachysterol will still contain 3-hydroxy-Δ-5.7-sterol, the latter compound can be readily removed by recrystallization or by precipitation with digitonine. From the residue the tachysterol can be isolated by transforming the compound into a readily crystallisable ester, for example, an ester of 3.5 dinitro-4-methyl-benzoic acid.

Since, as a rule, not the production of tachysterol but that of dihydro-tachysterol will be the aim of the method, the raw transformation product or the product already separated to a considerable extent from by-products may be reduced by means of an alkali metal and an alcohol, the dihydro-tachysterol being then obtained. As a rule, the alkali-metal will be sodium, the alcohol a lower aliphatic alcohol, for example, propanol or, preferably, 2-methyl-butanol-2 or a multivalent alcohol, for example, ethylene-glycol or glycerol.

From this raw reaction product, which is capable in itself to raise the calcium content of the blood, may be isolated dihydro-tachysterol by transforming the compound into a readily crystallisable ester. To this end use may for example be made of the method described in Dutch Patent Specification 50,402.

The transformation of a pre-calciferol into tachysterol cannot be accounted for with certainty. On the ground of results obtained in accordance with the invention it may be assumed that a precalciferol, in contradistinction to what has hiterto been assumed has the following cis-structure:

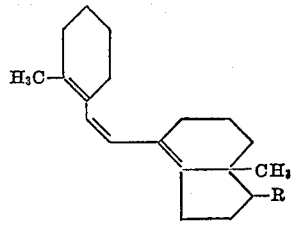

In this formula R designates the same as stated in column 1, lines 39, 40. It is evident from this formula that a pre-calciferol may be considered as a cis-isomer of a tachysterol, which compound has a so-called transstructure.

Example I

By alkaline hydrolysis of 3.5-dinitro-benzoic acid ester of pre-vitamin D₂ (Velluz and others, Bull. Soc. Chim. 2949, pages 501 ff.) previtamin D₂ was obtained as a colourless, resinous substance with an ultraviolet absorption maximum at 2630 A. 199 mgs. thereof was dissolved in 100 ccms. of paraffin oil ether (boiling range 40° to 60° C.). To this solution was added a solution of 0.25 iodine in 0.1 ccm. of paraffin oil ether. The mixture was irradiated in a nitrogen atmosphere by an incandescent lamp of 200 w. After 10 minutes it was found by spectro-photometric examination that the ultraviolet absorption spectrum of the solution had the shape characteristic of tachysterol₂, i. e. a peak lying at 2810 A.

Example II 0.2% of a solution of ergosterol in ethanol was irradiated by ultraviolet light of longer wavelengths than 2650 A. The radiation was continued until 35% of the ergosterol had been transformed. From the solution thus obtained, which contained not only untransformed ergosterol but also a large quantity of pre-vitamin $D_2$ and a small quantity of lumisterol$_2$ and tachysterol$_2$, the largest part of the untransformed ergosterol was removed by evaporating the solution rapidly at room temperature to a small volume, by causing the residue to crystallize at $-5°$ C. and by filtering off the precipitated ergosterol. The filtrate thus obtained was evaporated to dryness in vacuo. Of the residue 1.5 mgs. was dissolved in 100 ccms. of cyclohexane. This solution exhibited an ultraviolet absorption maximum at 2630 A., $E_{1cm}^{1\%}$ of the dissolved substance $= 193$ To the cyclohexane solution was added 0.02 mg. of iodine in 0.15 ccm. of cyclohexane. After an irradiation of 10 minutes in nitrogen atmosphere with a lamp of 200 w. the ultraviolet absorption spectrum was measured. It was found to have a peak at 2800 A., ($E_{1cm}^{1\%}$ of dissolved substance $= 302$)

from which the formation of tachysterol$_2$ from pre-vitamin $D_2$ was evident.

*Example III*

500 mgs. of pre-vitamin $D_2$ was dissolved in 30 ccms. of di-ethyl-ether, to which was added 10 mgs. of pyridine. In the solution was dissolved 10 mgs. of iodine, after which the mixture was exposed to diffuse day light for 40 minutes in a glass receiver, in which the air had been replaced by nitrogen. After this period the mixture was shaken in a separation funnel under nitrogen with diluted thiosulphate solution to remove the iodine. The etheric solution was distilled off, subsequent to drying, the residue was dissolved in a few ccms. of benzene, this benzene was distilled off in vacuo to remove traces of moisture. The residue was dissolved in 5 ccms. of anhydrous benzene, after which 3 ccms. of anhydrous pyridine was added to this solution and then a solution of 0.5 g. of 3,5-dinitro, 4-methylbenzoylchloride in benzene, the operations being performed with the exclusion of humidity in a nitrogen atmosphere. After having kept the mixture at room temperature for 18 hours, tachysterol$_2$ dinitromethylbenzoic acid ester was isolated by adding to the reaction mixture diethyl ether and water and by washing the etheric extract with diluted acid, aqueous bicarbonate solution, salt solution and water and by then drying the extract and by subjecting it to vacuum distillation. The ester was recrystallized from acetone and from the melting point of the mixture and the X-ray photograph of powdery preparations it was found that it was identical with tachysterol$_2$-ester produced in a different manner. The tachysterol$_2$ to be obtained therefrom by alkaline hydrolysis has, in an ether solution, an ultraviolet absorption spectrum identical with that of a tachysterol$_2$ preparation produced in a different manner, $E_{1cm}^{1\%}$ (2810) $= 700$ Also the infrared absorption spectrum is identical with that of a known tachysterol$_2$ preparation.

6.5 gs. of tachysterol$_2$-3.5 dinitro-4-methylbenzoic acid ester was dissolved in 125 ccms. of thiophene-free benzene. To the mixture was added, whilst shaking in a nitrogen atmosphere, a solution of 5 gs. of potassium hydroxide in 125 ccms. of methanol. The mixture was heated at 45° C. for 10 minutes: subsequent to cooling it was poured out in 375 ccms. of water and the aqueous suspension was extracted with diethyl ether. The solution in ether-benzene was washed with water, dried with anhydrous sodium-sulphate and free from solvent by distillation, the operations being all carried out in a nitrogen atmosphere. The residue was dissolved in 50 ccms. of anhydrous xylene and the solution was added to a suspension of 10 gs. of sodium in 100 ccms. of absolute xylene, which had been heated to 150° C. in a recipient provided with a reflow cooler and a dripping funnel under exclusion from humidity. Whilst agitated vigorously and under a flow of nitrogen a mixture of 60 ccms. of 2-methyl-butanol-2 and 40 ccms. of anhydrous xylene was added by dripping for 15 minutes, after which 60 ccms. of 2-methyl-butanol-2 was added by dripping twice during 15 minutes. Then the agitation was continued vigorously at this temperature for 1¼ hours. The excess of sodium was dissociated, subsequent to cooling, with 90% of ethanol. The mixture was then subjected to steam distillation. After all xylene had been removed by evaporation, the residue in the recipient was extracted with ether. The etheric solution was washed with water three times, dried and subjected to distillation. The amorphous residue had the ultraviolet absorption spectrum of dihydro tachysterol$_2$ (maxima at 242, 251 and 261 m$\mu$).

($E_{1cm}^{1\%} = 380$ at $251 m\mu$)

This product was esterified with 3.5-dinitro-benzoylchloride in benzene in the presence of pyridine under the exclusion of humidity. From the ester mixture obtained was removed by crystallisation 1.9 gs. of 3.5-dinitrobenzoic acid ester of dihydro-vitamin $D_2$—I. The filtrate was subjected to distillation in vacuo, the residue was dissolved in benzene. With a solution of potassium hydroxide in methanol the product was hydrolized. By extraction with di-ethyl ether 2.7 gs. of an amorphous substance was obtained. According to an ultraviolet absorption measurement it contained about 50% of dihydro-tachysterol$_2$. This product was dissolved in paraffin oil ether and filtered in a column of 35 grs. of aluminum oxide (activity III according to Brockmann).

The column was washed subsequently with paraffin oil ether. The first two litres of eluate contained 1.3 grs. of substance, which contained 67% of dihydro-tachysterol according to the ultraviolet absorption spectrum. This product was dissolved in 7 ccms. of anhydrous pyridine. To the mixture was added 2.7 ccms. of acetic acid anhydride. After one night at room temperature the mixture was poured out, whilst stirring, into a saturated, aqueous sodium bicarbonate solution, which was warmed at 40° C. After half an hour the reaction mixture was mixed with di-ethyl ether. The ether layer was washed with diluted acid, then with saturated, aqueous bicarbonate solution and finally with water. Subsequent to drying the solvent was distilled off. The residue was recrystallised at low temperature from 1 ccm. of paraffin oil ether (60 to 80°), dihydro-tachysterol$_2$ acetate being thus crystallised out. Subsequent to recrystallisation from methanol the production was 385 mgs., the melting range was 106 to 108° C.

With alkaline hydrolysis the acetate yielded crystallised dihydro-tachysterol$_2$.

*Example IV*

2 mgs. of pre-vitamin $D_2$ was dissolved in 100 ccms. of cyclohexane. To the solution was added about 0.25 ccm. of a saturated solution of eosine in cyclohexane. The solution was exposed to direct sunlight in a glass recipient. After 30 minutes the ultraviolet absorption spectrum was determined. The maximum at 2630 A. of the pre-vitamin $D_2$ had shifted to 2700 to 2800 A., from which the formation of tachysterol$_2$ was evident.

What is claimed is:

1. A method of producing a tachysterol comprising the steps of adding to a solution containing pre-calciferol and having an alkalinity extending from neutral to slightly alkaline, a catalyst capable of transforming cis-isomers to trans-isomers and selected from the group consisting of iodine and eosine, and exposing said solution to the action of actinic light to convert the pre-calciferol to a tachysterol.

2. A method of producing a dihydrotachysterol comprising the steps of adding to a solution containing precalciferol and having an alkalinity extending from neutral to slightly alkaline, a catalyst capable of transforming cis-isomers to trans-isomers and selected from the group consisting of iodine and eosine, exposing said solution to the action of actinic light to convert the pre-calciferol to a tachysterol, and subjecting the tachysterol to the action of an alkali metal and an aliphatic alcohol to reduce the same to the corresponding dihydrotachysterol.

3. A method of producing a tachysterol comprising the steps of adding to a solution containing pre-calciferol and having an alkalinity extending from neutral to slightly alkaline, a catalyst selected from the group consisting of eosine and iodine, and exposing said solution to the action of actinic light to convert the pre-calciferol to a tachysterol.

4. A method of producing a dihydrotachysterol comprising the steps of adding to a solution containing pre-calciferol and having an alkalinity extending from neutral to slightly alkaline, a catalyst selected from the group consisting of eosine and iodine, exposing said solution to the action of actinic light to convert the pre-calciferol to a tachysterol, and subjecting the tachysterol to the action of an alkali metal and an aliphatic alcohol to reduce the same to the corresponding dihydrotachysterol.

5. A method of producing a tachysterol comprising the steps of adding to a solution containing pre-calciferol in a liquid hydrocarbon solvent and having an alkalinity extending from neutral to slightly alkaline, a catalyst selected from the group consisting of eosine and iodine, and exposing said solution to the action of actinic light to convert the pre-calciferol to a tachysterol.

6. A method of producing a tachysterol comprising the steps of adding to a solution containing pre-calciferol in a solvent selected from the group consisting of diethyl ether and carbon disulfide and having an alkalinity extending from neutral to slightly alkaline, a catalyst selected from the group consisting of eosine and iodine, and exposing said solution to the action of actinic light to convert the pre-calciferol to a tachysterol.

7. A method of producing a tachysterol comprising the steps of adding to a solution containing about 1 mg. pre-calciferol in 100 ccs. of a solvent selected from the group consisting of diethyl ether and carbon disulfide and having an alkalinity extending from neutral to slightly alkaline, a tertiary amine and a catalyst capable of transforming cis-isomers to trans-isomers and selected from the group consisting of iodine and eosine, and exposing said solution to the action of actinic light to convert the pre-calciferol to a tachysterol.

8. A method of producing a dihydrotachysterol comprising the steps of adding to a solution containing pre-calciferol and having an alkalinity extending from neutral to slightly alkaline, a tertiary amine and a catalyst capable of transforming cis-isomers to trans-isomers and selected from the group consisting of iodine and eosine, exposing said solution to the action of actinic light to convert the pre-calciferol to a tachysterol, and subjecting the tachysterol to the action of an alkali metal and an aliphatic alcohol to reduce the same to the corresponding dihydrotachysterol.

9. A method of producing a tachysterol comprising the steps of irradiating a solution having an alkalinity extending from neutral to slightly alkaline and containing a 3-hydroxy-$\Delta$-5,7 sterol with ultra-violet light to convert a portion of the same to a pre-calciferol, removing from said solution after irradiation 3-hydroxy-$\Delta$-5,7 sterols, adding to said solution a catalyst capable of transforming cis-isomers to trans-isomers and selected from the group consisting of iodine and eosine, and exposing said solution to the action of actinic light to convert the pre-calciferol to a tachysterol.

10. A method of producing a dihydrotachysterol comprising the steps of irradiating a solution having an alkalinity extending from neutral to slightly alkaline and containing a 3-hydroxy-$\Delta$-5,7 sterol with ultra-violet light to convert a portion of the same to a pre-calciferol, removing from said solution after irradiation 3-hydroxy-$\Delta$-5,7 sterols, adding to said solution a catalyst capable of transforming cis-isomers to trans-isomers and selected from the group consisting of iodine and eosine, exposing said solution to the action of actinic light to convert the pre-calciferol to a tachysterol, and subjecting the tachysterol to the action of an alkali metal and an aliphatic amine to reduce the same to the corresponding dihydrotachysterol.

References Cited in the file of this patent

Thibaudet: Chem. Abstracts, vol. 40 (1946) col. 1529 (1 page).

Fieser et al.: "Natural Products Related To Phenanthrene" (3rd Ed., 1949) pages 172, 175 (2 pages), pub. by Reinhold Pub. Corp., New York.